UNITED STATES PATENT OFFICE.

AUGUSTE J. ROSSI AND LOUIS E. BARTON, OF NIAGARA FALLS, NEW YORK, ASSIGNORS TO THE TITANIUM ALLOY MANUFACTURING COMPANY, OF NEW YORK, N. Y., A CORPORATION OF MAINE.

METHOD OF OBTAINING TITANIC OXID AND THE RESULTING PRODUCT.

1,166,547.   Specification of Letters Patent.   Patented Jan. 4, 1916.

No Drawing.   Application filed April 18, 1914.   Serial No. 832,747.

*To all whom it may concern:*

Be it known that we, AUGUSTE J. ROSSI and LOUIS E. BARTON, both citizens of the United States, and residents of Niagara Falls, in the county of Niagara and State of New York, have jointly invented certain new and useful Improvements in Methods of Obtaining Titanic Oxid and the Resulting Product, of which the following is a specification.

Our present invention relates to production of concentrates of titanic oxid from substances containing it entangled with undesired elements and compounds, and the objects of our invention comprise production of a calcined concentrate, whiter than heretofore, because containing a higher percentage of titanic oxid ($TiO_2$) and a lower percentage of undesired substances such as iron oxids, such a concentrate being desirable for several purposes, including particularly the manufacture of pigments for use in paint.

Another object of our invention is the production of $TiO_2$ concentrates by aid of procedures more simple, rapid, certain, economical and more easily and satisfactorily practised than heretofore.

Our present process is applicable to the obtaining and concentration of titanic oxid from any substance naturally or artificially containing it, but is of special value in the treatment of so called "titaniferous iron ores", including ilmenite, rutile, etc., in all of which the titanic oxid is so, more or less, closely associated and entangled with iron compounds as to have hitherto rendered it difficult, or prohibitively expensive, to avoid an, for some purposes, undesirable buff or yellow coloration of the final concentrate product, attributable to its retention of low percentages of iron.

We attain our said objects by the following procedures, the final resulting concentrate product of which is, we believe, whiter in coloration and higher in titanic oxid, than any disclosed as obtainable from ores or other substances containing such oxid in association with compounds of iron.

In our previous applications for patents still pending and designated as Serial Numbers 733,945 and 733,944, filed November 29, 1912, we have disclosed methods for producing titanic oxid concentrates, comprising the smelting of titaniferous ore with oxid of an alkali metal, or also with carbon, and treatment of the resulting melt in a bath containing sulfuric, or hydrochloric, acid, so dilute as to dissolve therein compounds, including those of iron, without, however, importantly dissolving the titanic oxid, which by aid of comparatively long boiling, while avoiding concentration, of the bath, we are finally able to separate therefrom, as the resulting concentrate.

Our present method we practise as follows: Taking, for example, as raw material from which to derive our $TiO_2$ concentrate, a titaniferous iron ore analyzing as follows: titanic oxid 52, iron oxids 40, silica, 3, alumina 4, we finely pulverize and smelt it mixed with an oxid of an alkali metal, preferably caustic soda, capable of contributing to the melt enough oxid of such alkali metal to fully react with all the constituents present having chemical affinity therefor, excess of such oxid being, however, neither injurious, nor prohibitively expensive, but, on the contrary, sometimes desirable for reasons hereinafter stated. For example, in treating such an ore as above analyzed, excellent results are obtainable by mixing with 100 parts thereof 58 parts by weight of a 70% $Na_2O$ commercial caustic soda. Or, as is sometimes preferable, if desired to withdraw from the melt in advance of our next step a proportion, or even as much as possible, of its iron compounds, we add to our mixture a reducing agent in proportion sufficient to reduce the oxid of iron but not the oxid of titanium, as for example, carbon in any of its forms, or preferably coke. In such case, in treating the said ore good results are obtained by proportioning the mixture for the melt as follows:

| | | |
|---|---|---|
| Ore | 298 parts.. | 59.6% |
| Caustic soda (70% $Na_2O$) | 172 " .. | 34.3% |
| Coke | 30 " .. | 6. % |

The smelting of the mixture is preferably performed in an electric furnace, though any other means might be employed capable of insuring a complete melt of the charge and, if carbon is employed, reduction of the iron oxids to molten iron. If a reducing agent be, as aforesaid, employed, the temperature is maintained sufficiently to enable the resulting iron to segregate, as by percolating through the charge, and to concentrate in an underlying molten bath, which is then, by tapping it, readily separated from the remainder of the melt, thus usually leaving in the latter not to exceed from 2% to 10% of oxid of iron. The melt, or what remains thereof after removing iron therefrom as aforesaid, we preferably comminute to say about 80 to 100 mesh, and, after preferably moistening it with water sufficiently to render is pasty, digest it in concentrated hydrochloric acid (such as supplied to the trade, i. e. specific gravity about 1.12 to 1.20) in the proportion, by weight, of approximately one to two parts of such acid to one part of melt. The reaction is immediate, as indicated by effervescence and generation of heat. We usually prefer to apply and maintain a gentle heat sufficient to accelerate completeness of the reaction. The resulting product of the digestion appears as a pasty lemon-colored mass. This we then immediately submerge and agitate in an abundance of water below boiling, and preferably cold, whereupon white hydrated titanic oxide, as a residual product, immediately settles. A proportion of eight to ten parts, by weight, of water to one of the original melt treated gives good results. This residual product, we separate, as by decantation, or preferably by filtration, and calcine it. The resulting final product is an extremely fine, soft, smooth, nearly white, powder, containing some little, or traces of, soda and also not less than 90%, or according to care and skill in operating, over 99% of amorphous, non-granular, non-crystalline, pure, titanic oxid, ($TiO_2$) chemically uncombined with other substances.

It is preferable, if not essential, that any heating be, as far as possible, refrained from during the settling of our residual product, as aforesaid. Our experience has demonstrated that if the products of digestion be heated, during its formation and settling, our final calcined powdered product will be more or less colored buff or yellow, which is undesirable for some purposes.

A modification of our above described process without departing from its basic features, consists in, prior to its aforesaid digestion in hydrochloric acid, lixiviating the melt in hot water. Such lixiviation decomposes sodium titanate present into titanic acid and free soda and removes the latter together with soda which may have remained inactive or is in excess of what is necessary for the reactions required during the melt. The soda thus saved can be utilized for other operations. The lixiviation referred to also results in less hydrochloric acid being required for digestion, it being in such case preferable, if only for economy, to regulate the amount of acid by analyses of the extracted melt so as to insure presence of but little more than needed to combine with its remaining soda and iron.

In cases in which the excess soda is thus lixiviated out of the melt, as well also in all cases in which it is desired to accelerate the settling of the extremely minute subdivisions of hydrated titanic oxid beneficially resulting from our process, we have discovered that addition of common salt (NaCl) to the above described charges of pasty yellow product of digestion and water, such addition being, preferably, by weight, say about 40% of the original melt treated, greatly hastens such settling.

In lieu of applying to the melt, or its residue after lixiviation, preliminarily produced hydrochloric acid we may sometimes for reasons of economy and without departing from our invention, produce the required hydrochloric acid in presence of the melt, by, after moistening it as before described, treating it to a bath of sulfuric acid ($H_2SO_4$) of say 66 B. and common salt (NaCl) proportioned according to the formula:

$$2\ NaCl + H_2SO_4 = Na_2SO_4 + 2HCl$$

and in such quantities as to furnish to a given weight of melt, and with no excess of sulfuric acid, the proportions of hydrochloric acid requisite for the required reactions.

Analyses of a sample of the precipitate obtained by our process from ore, as above described, gave in respectively its dried at temperature not exceeding 100° C. and finally calcined, states, the following respective results, viz:—

|  | Dried. | Calcined. |
|---|---|---|
| Combined water | 10.69% |  |
| Chlorin | 2.31 |  |
| Soda | 0.36 | .41% |
| Oxid of iron | 0.16 | .18 |
| Alumina | None. |  |
| $TiO_2$ | 85.84 | 99.32 |
|  | 99.36% | 99.91% |

By calcination the combined water and chlorin are driven out, and in two other instances samples of our final calcined $TiO_2$ concentrate product similarly derived gave, by analysis the following respective results, viz:

| | | |
|---|---|---|
| TiO₂ | 99.25 | 99.42 |
| Oxid of iron | 0.33 | Little. |
| Soda | 0.42 | 0.15 |

Analyses of other samples showed as high as 99.59% TiO₂, traces only of oxid of iron and some little soda.

It will be noted that our products of our hereinbefore described processes are by their content of soda distinguishable from other titanic oxid concentrate products claimed by us, as for example, those covered by claims of Letters Patent No. 1,106,406, granted to us August 11, 1914.

Having now described our invention, what we claim as new and desire to secure by Letters Patent are the following, viz:

1. The process of obtaining titanic oxid (TiO₂) from a substance containing it and iron oxid which comprises melting said substance together with oxid of an alkali metal; digesting the resulting melt by hydrochloric acid in substantially the proper amount to combine only with alkali metal and iron present; and then adding to the product of digestion water in such quantity, and of temperature so low, as to promote settling therein of titanic, while retaining in solution other compounds.

2. The process of obtaining titanic oxid (TiO₂) from a substance containing it and iron oxid which comprises melting said substance together with oxid of an alkali metal; digesting the resulting melt by hydrochloric acid in substantially the proper amount to combine only with alkali metal and iron present; adding to the product of digestion water in such quantity, and of temperature so low, as to promote settling therein of titanic, while retaining in solution other compounds, withdrawing the liquor and calcining the residual product.

3. The process of obtaining titanic oxid (TiO₂) from a substance containing it and iron oxid which comprises melting said substance together with oxid of an alkali metal; digesting the resulting melt by hydrochloric acid; adding water to the product of digestion in such quantity, and of temperature so low, as to promote settling therein of titanic, while retaining in solution other, compounds; and incorporating enough chlorid of sodium to accelerate such settling.

4. The process of obtaining titanic oxid (TiO₂) from a substance containing it and iron oxid which comprises melting said substance together with oxid of an alkali metal; lixiviating the resulting melt to remove excess soda; digesting the residue by hydrochloric acid in substantially the proper amount to combine only with alkali metal and iron present; and then adding to the product of digestion water in such quantity, and of temperature so low, as to promote settling therein of titanic, while retaining in solution other compounds.

5. The process of obtaining titanic oxid (TiO₂) from a substance containing it and iron oxid which comprises melting said substance together with oxid of an alkali metal; lixiviating the resulting melt to remove excess soda; digesting the residue by hydrochloric acid in substantially the proper amount to combine only with alkali metal and iron present; adding to the product of digestion water in such quantity, and of temperature so low, as to promote settling therein of titanic, while retaining in solution other, compounds; withdrawing the liquor, and calcining the residual product.

6. The process of obtaining titanic oxid (TiO₂) from a substance containing it and iron oxid which comprises melting said substance together with oxid of an alkali metal; lixiviating the resulting melt to remove excess soda; digesting the residue by hydrochloric acid; adding to the product of digestion water in such quantity, and of temperature so low, as to promote settling therein of titanic, while retaining in solution other compounds; and incorporating enough chlorid of sodium to accelerate such settling.

7. The process of obtaining titanic oxid (TiO₂) from a substance containing it and iron oxid which comprises melting said substance together with oxid of an alkali metal; digesting the resulting melt by concentrated hydrochloric acid; and then adding to the product of digestion water in such quantity and of temperature so low as to promote settling therein of titanic, while retaining in solution other, compounds.

8. The process of obtaining titanic oxid (TiO₂) from a substance containing it and iron oxid which comprises melting said substance together with oxid of an alkali metal; digesting the resulting melt by concentrated hydrochloric acid of specific gravity about 1.12 to 1.20; and then adding to the product of digestion water in such quantity and of temperature so low as to promote settling therein of titanic, while retaining in solution other, compounds.

9. The process of obtaining titanic oxid (TiO₂) from a substance containing it and iron oxid which comprises melting said substance together with oxid of an alkali metal; digesting the resulting melt by concentrated hydrochloric acid of specific gravity about 1.12 to 1.20 in the proportion by weight of approximately one to two parts of such acid to one part of the melt; and then adding to the product of digestion water in such quantity and of temperature so low as to promote settling therein of titanic, while retaining in solution other, compounds.

10. As a new article of manufacture a titanic oxid concentrate characterized as being a nearly white, fine, soft, smooth powder, containing soda and also not less than 90% of amorphous, non-granular, non-crystalline, titanic oxid ($TiO_2$) chemically uncombined with other substances.

AUGUSTE J. ROSSI.
LOUIS E. BARTON.

Witnesses as to Auguste J. Rossi:
PHILIP C. PECK,
WILLIAM J. HOPKINS.
Witnesses as to Louis E. Barton:
ANDREW THOMPSON,
WM. V. KNOWLES.